(12) United States Patent
McCurdy (10) Patent No.: US 9,317,271 B2
(45) Date of Patent: Apr. 19, 2016

(54) SOFTWARE DISTRIBUTION ARCHITECTURE FOR HARDWARE DEVICES

(71) Applicant: Amazon Technologies, Inc., Reno, NV (US)

(72) Inventor: Daniel Kenneth McCurdy, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 14/074,529

(22) Filed: Nov. 7, 2013

(65) Prior Publication Data

US 2015/0128128 A1     May 7, 2015

(51) Int. Cl.
    *G06F 9/44*         (2006.01)
    *G06F 9/445*       (2006.01)

(52) U.S. Cl.
    CPC .................................. *G06F 8/61* (2013.01)

(58) Field of Classification Search
    CPC ....................................................... G06F 8/61
    USPC ........................................................ 717/177
    See application file for complete search history.

(56) References Cited

U.S. PATENT DOCUMENTS

| | | | |
|---|---|---|---|
| 8,584,115 B2 * | 11/2013 | Finkelstein et al. .......... | 717/173 |
| 2002/0147027 A1 | 10/2002 | Alford, Jr. et al. | |
| 2010/0088696 A1 * | 4/2010 | Stoev et al. ................... | 717/178 |
| 2010/0217944 A1 * | 8/2010 | DeHaan et al. ............... | 711/156 |
| 2011/0276961 A1 * | 11/2011 | Johansson et al. ........... | 717/178 |
| 2012/0246631 A1 * | 9/2012 | Chen et al. .................... | 717/172 |
| 2013/0091216 A1 | 4/2013 | Rajakarunanayake et al. | |
| 2013/0237204 A1 | 9/2013 | Buck et al. | |
| 2015/0006870 A1 * | 1/2015 | Switzer et al. .................... | 713/1 |
| 2015/0081837 A1 * | 3/2015 | Bernier et al. ................ | 709/217 |

OTHER PUBLICATIONS

PCT Search Report and Written Opinion mailed Jan. 26, 2015 for PCT Application No. PCT/US14/63478, 9 Pages.

* cited by examiner

*Primary Examiner* — John Chavis
(74) *Attorney, Agent, or Firm* — Lee & Hayes, PLLC (57) ABSTRACT

A software distribution architecture includes cloud-based services and user devices that access those services. When a user purchases a new device, the cloud-based services identifies the user, associates the new device with the user, and determines whether the user has existing devices presently registered with the service. If an existing device is found, the cloud-based service automatically distributes software to the existing device for use in configuring the new device after that new device is physically delivered to the user. When the user powers on the new device for a first time, the new device is automatically configured using the software on the existing devices so that the new device is ready for immediate operation after being powered on. Further, the existing device may be used, through execution of the software, to initiate operations being performed by the new device.

22 Claims, 5 Drawing Sheets

SOFTWARE DISTRIBUTION ARCHITECTURE FOR HARDWARE DEVICES

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, gesture, and speech.

With each evolution, users are often faced with a new device that may be unfamiliar. Further, to function properly, some devices require an initial configuration that might involve setting up the device to connect seamlessly to a network, such as a WiFi network. The user's general unfamiliarity with a new product and perhaps lack of knowledge about basic configuration details may cause the user to have a poor "out-of-box" experience because the product seemingly does not start working when first powered on.

Accordingly, there is a need for techniques to improve "out-of-box" experiences during configuration of a new device, particularly for devices that are used in conjunction with other existing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 shows a first or software distribution phase in which the user purchases a new device and software is pushed to existing devices associated with the user. FIG. 2 shows a second or fulfillment phase in which the new device is physically delivered to the user and then automatically configured using the software on the existing devices so that the new device is ready for immediate operation after being powered on.

DETAILED DESCRIPTION

An architecture for automatic software distribution to existing and registered devices based upon a purchase of a new device is described. The architecture is described in the context of a particular architecture in which users can request and receive information from a network accessible computing platform, or "cloud service", through any number of devices equipped with a WLAN interface, such as tablets, laptops, communication devices, speech devices, gaming systems, entertainment devices, and so forth.

When a user purchases a new device, the new device is associated with the user and provisioned for delivery. Software designed to communicate with the new device is then automatically pushed or otherwise distributed to existing devices that are registered as belonging to the user. The software application is loaded on the existing devices to facilitate seamless connection to the new device when present. The software may have essentially any purpose for use by the new device or the existing device. The software, when executed by the existing device, may facilitate use of the new device. Examples may include assisting with configuration of the new device, providing a new operating system or version update to the existing devices to enable cooperation with the new device, and installing new functionality on either the new or existing devices that was not previously available. As an example, in the case of a configuration application, when the user receives the new device and powers it on, the new device communicates with one or more of the existing devices via the previously loaded software application to obtain configuration information, such as the SSID, access key, WiFi network names, and addresses. The new device is configured using the information and is then ready to use. To the user, the device seems ready to use and already on the local network without any effort on the user's part, thereby significantly enhancing the "out-of-box" experience for the user.

The architecture may be used in conjunction with essentially any type of electronic computing devices. As an example, the existing device may be a personal computer, smartphone, tablet, watch, glasses, or the like. The new device may be a television, a game system, a digital media receiver, a network connected switch, a refrigerator or other appliance, and the like.

The architecture may be implemented in many ways. Several implementations are described below, but these are merely representative. Other architectures may be implemented in various contexts and situations in which automatic software distribution to existing devices is triggered upon purchase of a new device by a user associated with the existing devices.

Illustrative Architecture and Scenarios

Figure 1:
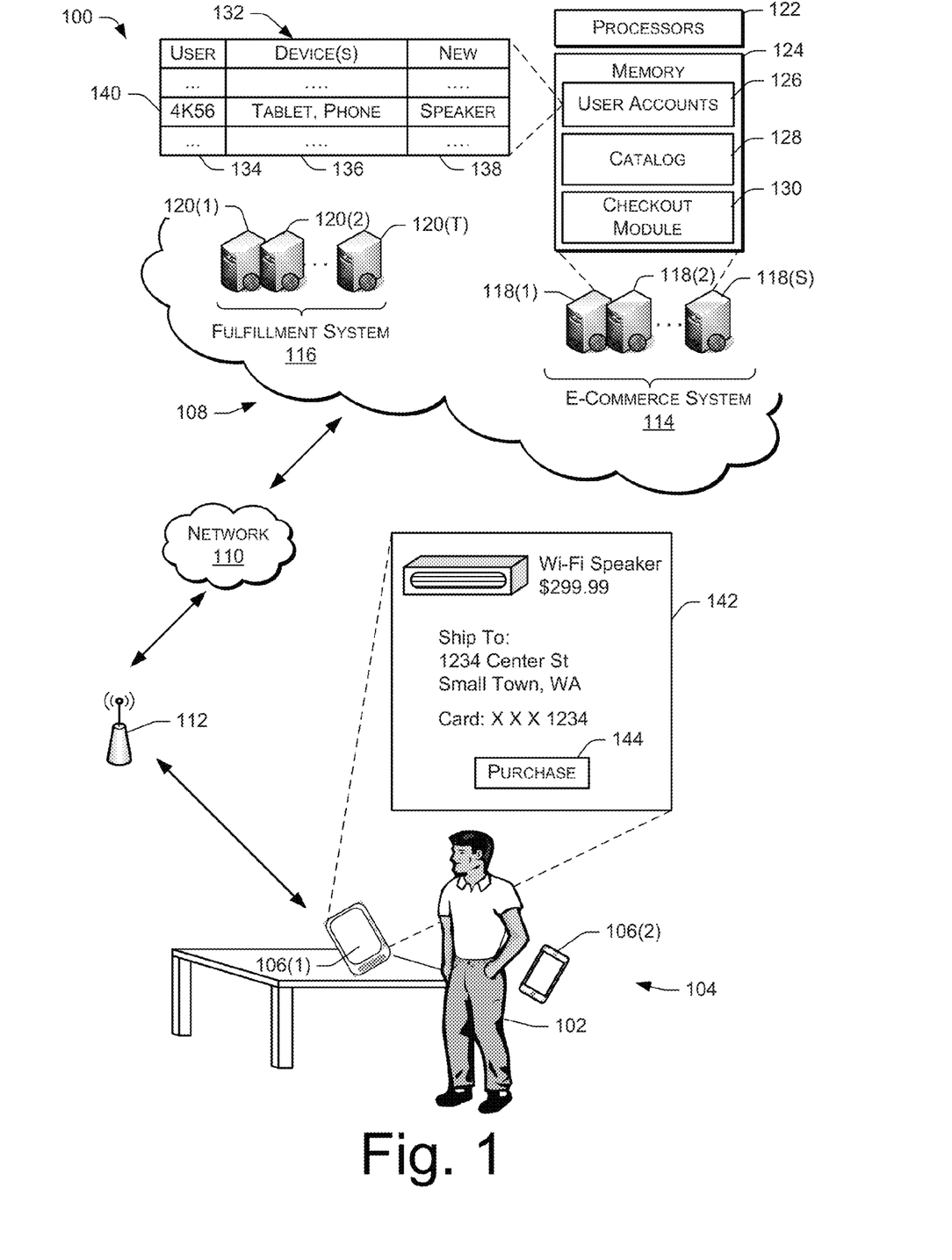
FIGS. 1 and 2 show an illustrative software distribution architecture in which software is distributed automatically to existing devices of a user in response to the user purchasing a new device.
Figure 2:
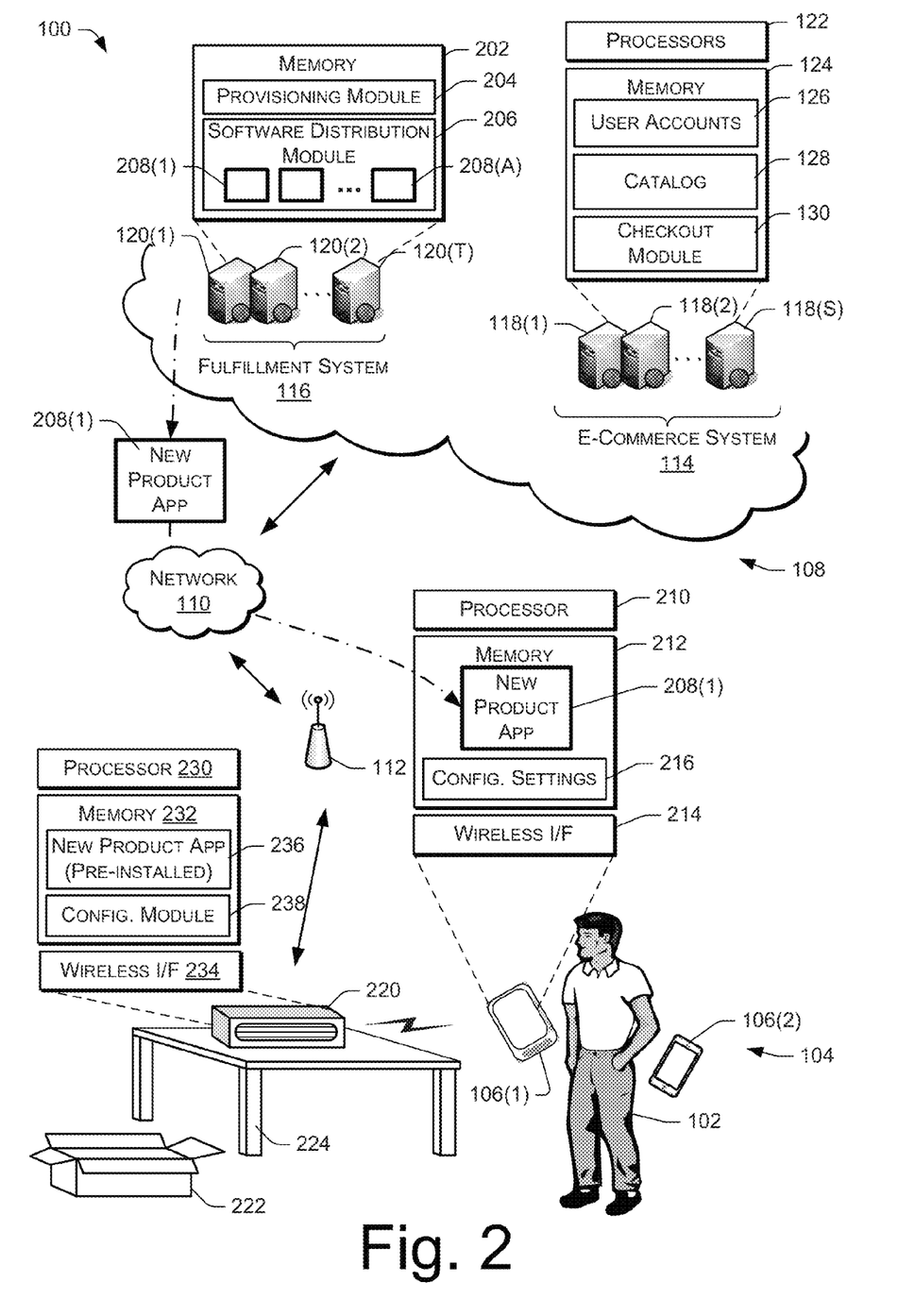

FIGS. 1 and 2 show an illustrative software distribution architecture 100 in which software is distributed automatically to existing devices of a user in response to the user purchasing a new device. In FIG. 1, the architecture 100 is shown executing a first or software distribution phase in which the user purchases a new device and software for communicating with the new device is pushed to existing devices associated with the user. In this example illustration, a user 102 is shown in a home or office environment 104. The user 102 has one or more existing devices, such as a tablet 106(1) and a communication device 106(2). These devices are merely representative, and other types of devices may also be included, such as televisions, smart appliances, eBook readers, desktop computers, laptops, entertainment devices, gaming systems, cable set-top boxes, watches, glasses, and so forth.

The existing devices 106 communicate with remote sites or services, which are visually represented as being cloud-based services 108, over a network 110. The existing user devices 106 may be communicatively coupled to the network 110 via wired technologies (e.g., wires, USB, fiber optic cable, etc.), wireless technologies (e.g., RF, cellular, satellite, Bluetooth, etc.), or other connection technologies. The network 110 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The network 110 carries data, such as audio data, between the cloud services 108 and the devices 106.

In FIG. 1, the environment 104 may further be equipped with a wireless local area network (WLAN) 112 to support wireless communication throughout the area. The WLAN 112 is assigned a service set identifier, or SSID, which allows all connected wireless devices to communicate with one another. Many WLANs are based on the IEEE standard, 802.11, and are commonly referred to by the brand name "Wi-Fi" networks, or simply "WiFi". Wifi networks may be public or private. A public WiFi network may be discovered through standard protocols to enable simple and quick access to the web. A private network has some security measures to limit access, such as an access key. Each of the existing devices 106 may be equipped with wireless interfaces that enable wireless communication with the WLAN 112.

The cloud services 108 generally refer to a network accessible platform implemented as a computing infrastructure of processors, storage, software, data access, and so forth that is maintained and accessible via a network such as the Internet. Cloud services 106 do not require end-user knowledge of the physical location and configuration of the system that delivers the services. Common expressions associated with cloud services include "on-demand computing", "software as a service (SaaS)", "platform computing", "network accessible platform", and so forth. The cloud services 108 may include any number of services including commerce, entertainment, productivity, mapping, financial, and so forth.

In FIG. 1, the cloud services 106 include an electronic commerce (e-commerce) service hosted by an e-commerce system 114 and a fulfillment service supported by a fulfillment system 116. The e-commerce system 114 is implemented by one or more servers, such as servers 118(1), 118(2), . . . , 118(S). Similarly, the fulfillment system 116 is implemented by one or more servers, such as servers 120(1), 120(2), . . . , 120(T). These servers 118(1)-(S) and 120(1)-(T) may be arranged in any number of ways, such as server farms, stacks, and the like that are commonly used in data centers. The servers have computing resources, as represented by processors 122 and memory 124 shown with the servers 118 (1)-(S), to store and execute any number of applications that can process the user input received from the existing user devices 106 and produce a suitable response. The memory 124 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

A few example functional modules are shown as applications stored in the memory 124 of the e-commerce system 114 and executed on the processors 122, although the same functionality may alternatively be implemented in firmware or as a system on a chip (SOC). The functional modules include a user accounts module or datastore 126, a catalog 128, and a checkout module 130. Other modules may further be executed on the e-commerce system 114, but are not shown merely for ease of discussion.

The user accounts module 126 is an application and datastore used to maintain user profiles of information about the users of the e-commerce system 114. The user profiles may include data pertaining to a user identity, purchase history, shipping addresses, billing information, user history, and so forth. The user profiles may also include information about the types of devices that the user has registered with the system 114.

For discussion purposes, a portion of the user profile is shown in FIG. 1 as a relational data table 132 in which a user identity is associated with registered devices. The table 132 includes a user ID field 134, an existing device field 136, and a new device field 138. Identities for the various devices, such as serial numbers or unique device identifiers, are maintained in the device field 136 in association with the user identity in the user ID field 134. In this example, a user profile record 140 shows that the user 102 has been assigned a user identifier of "4K56" in the user ID field 134 and that he has registered both the tablet 106(1) and the smartphone 106(2), as indicated in the existing device field 136.

The user's devices 106(1) and 106(2) may be registered with the system 114 in any number of ways. For instance, the user may have purchased the devices from the e-commerce service. As another example, the e-commerce service may offer an application or "app" store with any number of applications that can be downloaded and stored on the devices, such as movie applications, game applications, productivity applications, e-reader applications, and so on. When the user selects and downloads an application, the device may be registered with the service through that activity.

The architecture 100 is designed to automatically distribute software to the user's registered devices based upon a purchase of a new device. To illustrate, suppose the user 102 decides to purchase a new device for his home. In this case, the user is interested in buying a wireless-enabled speaker for his home entertainment system. The user 102 employs his tablet 106(1) to visit the e-commerce system 114 of the cloud services 108. The tablet 106(1) wirelessly connects with system 114 via the WLAN point 112 and network 110, and is used to search the catalog 128 of items, which includes the speaker. After deciding on the speaker, the user is taken to the checkout module 130 to purchase the item. A user interface (UI) 142 on the tablet 106(1) shows a portion of the checkout process supported by the checkout system 128. The checkout UI 142 presents the item being purchased, the shipping address, and payment information. The user is provided with an actuatable "purchase" soft key 144 that, upon actuation (e.g., touch), initiates a purchase of the wireless speaker. It is noted that the speaker is merely a representative example, as other types of devices may be used, such as televisions, gaming systems, digital media receivers, network connected switches, refrigerators or other appliances, and so forth.

When a user purchases the new device (e.g., the speaker), the checkout module 130 initiates a process to update the user profile record 140 in the user accounts 126 to associate the new device with the user. This is shown diagrammatically by the new device field 138 including an identifier to the speaker. In some implementations, the user may be given a notice letting him know that new software will be installed on one or more of his existing devices to help configure the new device when it arrives. This notice may be part of the checkout process or an independent communication. Further, the notice may include a request for permission to download the application, before doing so, which involves an affirmative response from the user. That is, the user is asked whether he would like to have the new device automatically configured and if so, would he approve receipt of a small application to facilitate this automatic configuration.

The process is then handed over to the fulfillment system 116 to fulfill this order by delivering the new device to the user. As part of this fulfillment, however, the architecture 100 automatically pushes new software to the user's registered devices 106(1) and 106(2) that may be used to instantly communicate with the new device following delivery to the user. This will now be explained in more detail in FIG. 2.

FIG. 2 shows a second or fulfillment phase of the architecture operation in which the new device is physically delivered to the user and then automatically configured using the software on the existing registered devices so that the new device is ready for immediate operation after being powered on. As shown, the fulfillment system 116 executes functional modules to fulfill orders received and processed by the e-commerce system 114. The functional modules are shown as applications stored in the memory 202 of the fulfillment system 116 for execution by processors, although the same functionality may alternatively be implemented in firmware or as a system on a chip (SOC). The functional modules include a provisioning module 204 and a software distribution module 206. Other modules may further be executed on the fulfillment system 116, but are not shown merely for ease of discussion.

When a new electronic device is purchased, the provisioning module 204 may be used to provision the electronic device to prepare it for delivery. The electronic device is equipped with wireless communication capabilities, so the provisioning may involve configuring or initiating the communication interface to operate on one or more network, such as WiFi, Bluetooth, cellular, and so forth.

The software distribution module 206 is configured to distribute software applications to one or more existing devices that are registered at, and hence known to, the systems 114 and 116 that are delivering the new device. The software distribution module 206 may maintain a library of software applications 208(1), . . . , 208(A) that are designed for various types of electronic devices. When a new electronic device is set for delivery, the software distribution module 206 electronically distributes one of these new product applications associated with the new product, such as new product app 208(1) for the speaker, over the network 110 to one or more of the user's registered devices 106(1) and 106(2).

In FIG. 2, the new product app 208(1) is installed on the tablet 106(1) as shown. More specifically, the tablet 106(1) is an electronic device with a processor 210, memory 212, and wireless interface 214. The memory 212 may include computer-readable storage media ("CRSM"), which may be any available physical media accessible by the processor 210 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 210. The wireless interface 214 is configured to support various near field communications, such as Bluetooth, WiFi, and the like. Further, the wireless interface 214 may support extended range communication, such as cellular, RF, or satellite communication.

The new product app 208(1) is loaded into the memory 212 for execution by the processor 210. In some implementations, a notice may be provided to the user 102 prior to, or after, installation of the new product app 208(1). This notice may be in the form of a visual message, an audible sound, or some other technique. The registered tablet 106(1) also maintains configuration settings 216 of the various data used to communicate with the wireless network. The configuration settings may include the SSID, access key, network names, or addresses of the wireless node 112, and any other data that may be useful to establish and support a connection to the wireless network. The registered tablet 106(1) may further maintain other information including user information, such user preferences, user history, user activity, and so forth.

In one implementation, part of the function of the new product app 208(1) is to retrieve the configuration settings 216 for use in configuring the new device. Accordingly, in some implementations, the new product app 208(1) may be considered as a configuration application used to assist in automatically configuring the new device. In other implementations, the new product app 208(1) may retrieve other information in addition to the configuration settings, such as the user information.

In still other implementations, the new product app 208(1) may have purposes other than, or in addition to, configuration of the new device. For instance, the new product app 208(1) may provide a new operating system or a version update to the existing devices to enable cooperation with the new device. In another situation, the new product app 208(1) may contain new functionality that may be executed on either the new device or existing devices that was not previously available. For instance, suppose the new device supports voice input. The software application may be provided to enable an existing device with the functionality to now receive voice input and transfer that to the new device. These are merely examples of types of software that may be automatically distributed to the existing devices.

Meanwhile, the ordered product is delivered to the user. In this example, the user 102 unpacks a wireless-enabled speaker 220 from its package 222 and places the speaker 220 on a table 224. The speaker 220 is an electronic device with a processor 230, memory 232, and a wireless interface 234. Additionally, two functional modules are shown stored in the memory 232 for execution on the processor 230. These modules include a pre-installed new product app 236 and a configuration module 238. The new product app 236 may be essentially similar to the new product app 208(1).

When the user powers on the new device (i.e., speaker 220), the new product app 236 attempts to communicate with any proximal device that has the new product app 208(1) installed thereon. In one implementation, the new product app 236 automatically initiates a pairing mode in which the speaker 220 attempts to locate a proximal device via a standard local communication protocol, such as WiFi direct or Bluetooth. In this example, suppose the tablet 106(1) is in the same environment 104 and sufficiently proximal to the new speaker. The speaker 220 and the tablet 106(1) communicate via the short range protocol, thereby enabling the new product app 236 on the speaker 220 to communicate with the new product app 208(1) on the tablet 106(1). During this communication, the new product app 208(1) transfers configuration settings 216 to the speaker 220 for use by the configuration module 238. Upon receipt of the settings, such as the SSID, network names, access key, and/or addresses of the WiFi node 112, the configuration module 238 automatically configures the speaker 220 for communication with the WLAN 112 of the home or office environment 104. Following this configuration, the new speaker is ready to use.

To the user, the speaker 220 essentially configures itself automatically upon powering on, with any intervention from the user. In this way, the user experience is significantly improved as the user merely removes the new device from the package and turns it on. There is no need for any experience with configuring electronic devices or recalling access keys and SSIDs. This improved "out-of-box" user experience is made possible due to the automated distribution of a software application to the existing user device in response to the purchase of the new device and in advance of delivery of the new device.

In some implementations, the speaker 220 may provide some affirmative notification that the setup is complete. For instance, the speaker 220 may provide may emit a signal (e.g., a beep or sequence of notes) or audio command (e.g., "configuration is complete") informing the user 102 that the setup is complete and successful. If the device is equipped with a display or light elements, the device may provide a visual cue that informs the user when the configuration is finished.

In some cases, the new product app 208(1) may also transfer other information that may be kept on the existing device, such as user profile information (e.g., identity, user preferences, user habits, and so forth). Such information may be collected and stored by the existing device to provide better service to the user. This information may be useful to the new device, depending upon the new device's functionality.

In some implementations, the software installed on the existing device, such as tablet 106(1), may facilitate use of the new device, such as the speaker 220. For instance, the installed software, when executed, may allow the tablet 106 (1) to send instructions or commands to the speaker 220. In other cases, the installed software may allow the tablet 106(1) to send signals to the cloud resources 108, which in turn send signals to the new speaker 220. In this manner, the identified software installed on the existing device allows the existing device to initiate one or more operations that result in actions being performed by the new device. In response to these commands or signals, the speaker 220 may perform the action. For example, a user of the tablet 106(1) may use the tablet 106(1) as a remote control for controlling the operation of speaker 220, to obtain information about music playing on speaker 220, or to transfer the content being played on speaker 220 to tablet 106(a).

In some cases, the user may decide later not to keep the new device, but instead return the new device. In this situation, the architecture may also be configured to remove the new product app from the existing devices. For instance, upon return of the new device, the fulfillment system and/or e-commerce system (or another system) may send a notice to the user to request whether the user would like to have the new product app 208(1) removed. If the user agrees, the system may inactivate the new product app 208(1) or send instructions to have it permanently deleted by the operating system of the existing device.

Illustrative Processes

Figure 3:
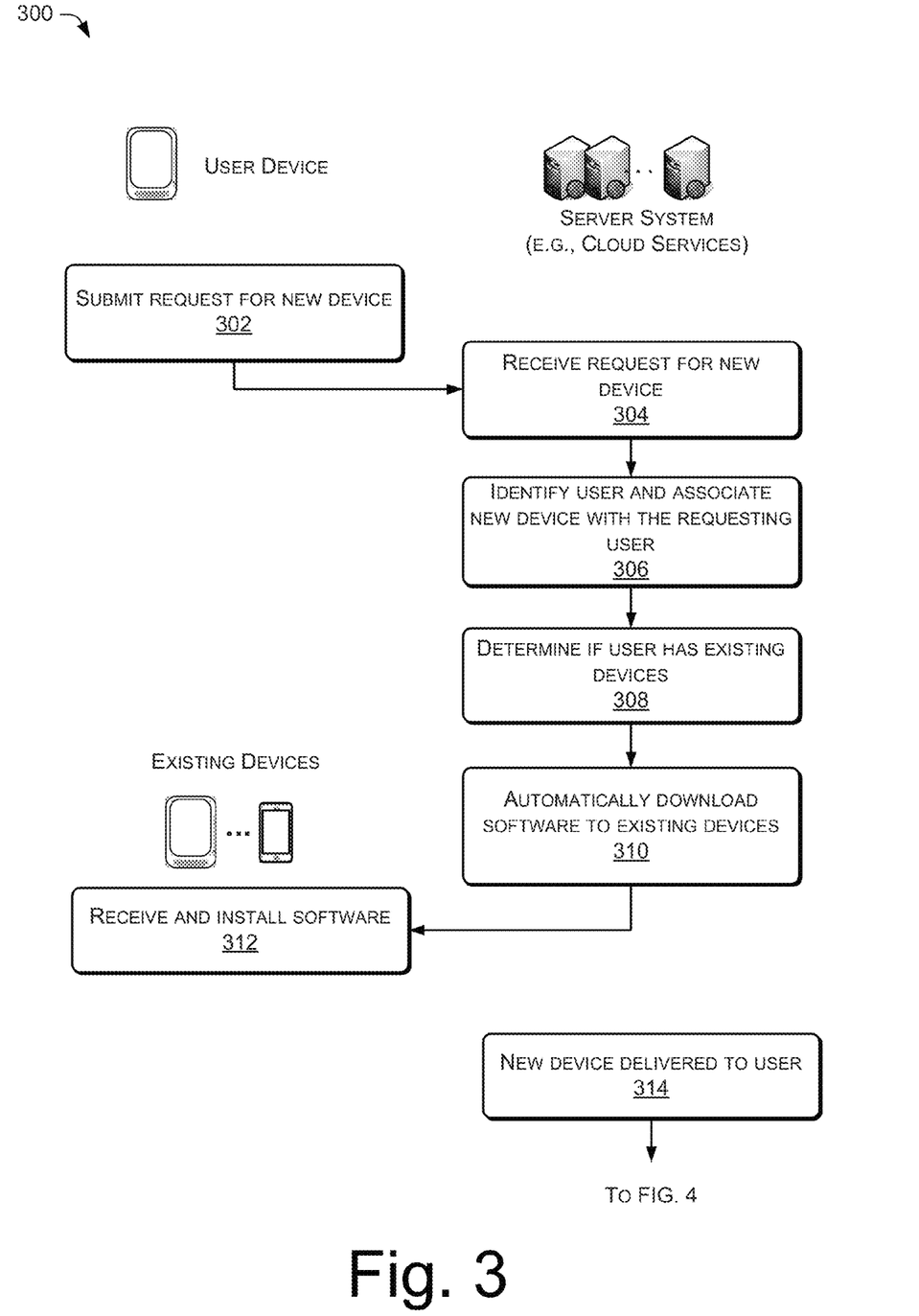
FIG. 3 presents a flow diagram showing an illustrative process of handling an order for a new device from a user and distributing software in response.
Figure 4:
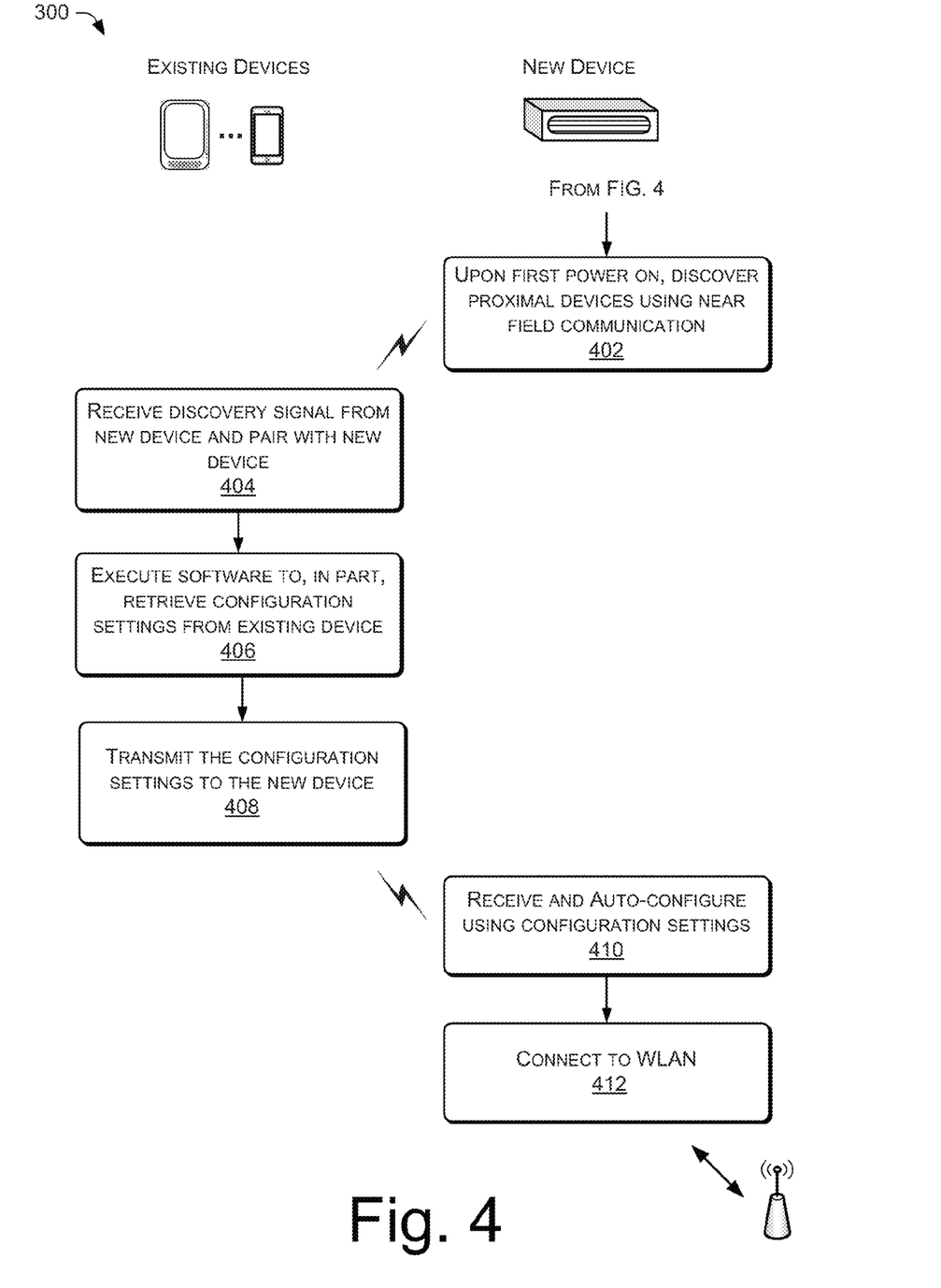
FIG. 4 is a flow diagram of an example process of configuring a new device using the software previously distributed to the existing device so that the new device seamlessly begins operating for the user without user intervention.

FIGS. 3 and 4 show a process 300 for automatically distributing software to existing devices for configuring newly purchased devices. The processes may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

For purposes of describing example implementations, the blocks are arranged visually in columns beneath various devices or systems to illustrate what parts of the architecture may perform the associated operations. That is, actions defined by blocks arranged beneath the devices may be performed by the devices, and similarly, actions defined by blocks arranged beneath the systems may be performed by the systems.

In FIG. 3, the process 300 begins at 302 with the user submitting a request for a new device. The user may submit this request using one of the registered devices, or a separate device. In some implementations, the request may be a purchase request in which the user has decided to purchase the new device. This is essentially the example shown and discussed above with respect to FIGS. 1 and 2. In that example, the user accessed an e-commerce site using a tablet and purchased a new wireless-enabled speaker. In other implementations, however, the request may not pertain to purchasing; rather the user may simply be requesting a new device that will be allocated to him or her.

At 304, the server system receives the request for a new device. Again, this request may be in the form of a purchase request received during the checkout process, or some other request for a device that is new to the user. At 306, upon receipt of this request, the server system identifies the user from the checkout information (or from information in the request) and associates the new device with that user. This association may be made through the user profile or other user account information, as illustrated in the example implementation of FIG. 1.

At 308, the server system determines whether the user has any other existing devices that are registered at, or otherwise known by, the server system. In one implementation, this information may be kept in the user account records. For instance, the user may have previously used an existing device to interact with the server system, such as when purchasing or downloading applications from an app store that maintains applications, such as eBook reader applications, movie applications, music applications, gaming applications, and so forth. In this example, the server system is aware of the user's other devices and is able to communicate with those other devices.

At 310, assuming an existing device is found, the server system automatically distributes software to the existing device. The software may be embodied as an application, module, or code designed to facilitate setup communication with the new device after the new device is delivered to the user. The software may be delivered electronically over networks to the existing device. For example, since the server system is aware of the existing device due to a previous interaction (e.g., application download from an app store), the server system automatically pushes the software to the known existing device. In some cases, the server system will inform the user of the downloaded software or may even ask permission to do so.

At 312, one or more of the existing devices receive the software and install it. Once installed, the software will help facilitate an automated configuration process by the new device.

At 314, the new device is physically delivered to the user. For instance, the new device is picked at a fulfillment center, packaged, and shipped to the user. Upon receipt, the user may then unpack the new device and power it on for the first time.

In some cases, the device may be delivered fully or partially powered, while in other situations, the user may have to charge the device initially or connect the device to a power source.

With continuing reference to FIG. 4, at 402, when the user first powers on the new device, the new device discovers whether other proximal devices are available. The new device may use near field communication protocols, such as WiFi direct or Bluetooth. Suppose, for continuing discussion, one of the existing devices is sufficiently near the new device.

At 404, the existing device receives the discovery signal from the new device and a communication pairing is established. At 406, the software previously loaded onto the existing device is executed. As part of this execution, the software retrieves configuration settings used by the existing device to communicate with the WLAN. The software may retrieve any other information that may be useful to the new device, such as user preferences and so forth.

At 408, the retrieved configuration settings and any other information is sent to the new device to assist in configuring the new device for wireless access to the WLAN. The configuration settings are transmitted over the pairing connection.

At 410, the configuration settings are received by the new device and used to automatically configure the new device. The configuration settings may include the SSID, access key, network address, and any other data usable to configure the new device for operation.

At 412, following configuration, the new device seamlessly connects to the WLAN for immediate operation by the user. The operations 402 to 412 may be performed in a short timeframe (e.g., a few seconds). To the user, the new device seems ready to use almost immediately upon removal from the package and powered on. The new device is seamlessly communicating with surrounding devices and with the WLAN without any effort on the user's part. Indeed, the user need not remember how to configure devices or recall network parameters. As a result, the "out-of-box" experience for the user is enhanced.

Figure 5:
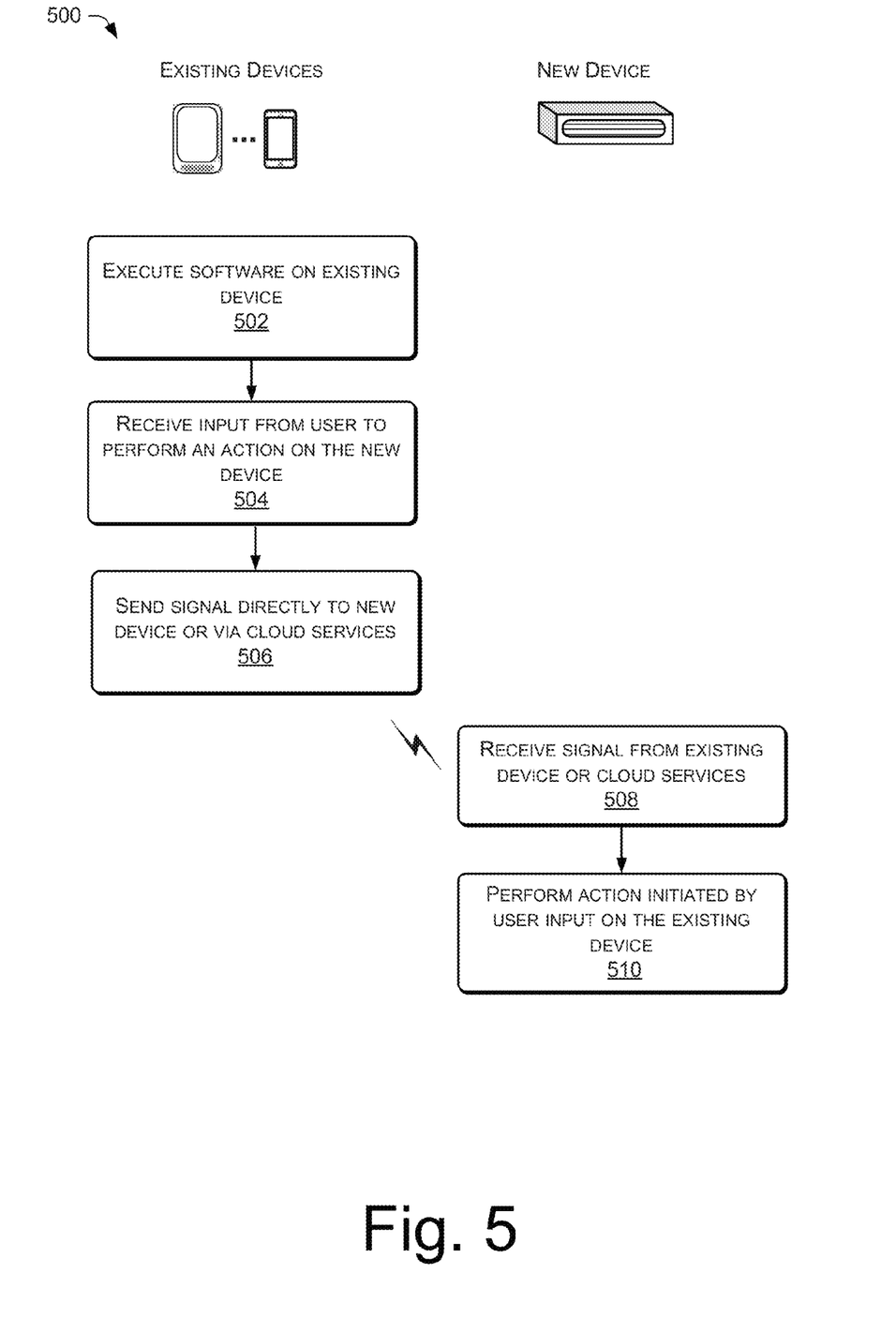
FIG. 5 is a flow diagram of an example process of using the software installed on the existing devices to facilitate use of the new device.

FIG. 5 shows an illustrative process 500 of using the software installed on one or more of the existing devices to facilitate use of the new device. The process 500 assumes that the software automatically distributed according to process 300 of FIGS. 3 and 4 is already installed on one or more of the existing devices. As noted above, in addition to or entirely separate from assisting with configuration, the software may be used in essentially any manner that facilitates use of the new device.

At 502, the software is executed on an existing device. In one example, the software may be an application used to control the new device, such as the new speaker. In such a situation, the user may choose the application to initiate a process with the new device.

At 504, input from the user is received by the existing device. The user input may be anything that causes an action to be performed by the new device. The user input may further be entered in many ways, including input on a touch-screen display, a button press, a voice command, a wireless local area network signal, or a near field communication signal.

At 506, a signal generated by the existing device is sent to the new device, either directly or via the cloud services. The signal may carry instructions or commands to initiate the action to be performed by the new device.

At 508, the new device receives the signal, from either the existing device or the cloud services.

At 510, the new device processes the signal, which causes the new device to perform the action that was originated by the user input on the existing device. That is, the user inputs instructions into the existing device, and those instructions ultimately, directly or indirectly, cause the new device to perform the intended operations.

In this way, the software that was automatically distributed as part of the process for purchasing or otherwise receiving a new device, is installed and executed on the existing devices to help operate the new device. To the user, this architecture allows his or her existing devices to control a new device (even a device that was not known or developed at the time when the existing device was made and sold). This makes the user experience of buying and using an unfamiliar new device much easier and perhaps more enjoyable for the user as configuration and ways to control or otherwise use the new device is automatically set up in advance for the user.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   memory to store computer-executable components processed by the one or more processors, the components including:
   a first component to identify an existing device that is currently available for use by a user;
   a second component to receive an indication that the user has purchased a new device and to associate the new device with the user, identify software for the existing device, and distribute the identified software to the existing device, wherein the identified software facilitates use of the new device;
   a third component to configure the existing device being configured to receive and install the identified software so that upon receipt of a user input to perform an action on the new device, the identified software installed on the existing device causes the existing device to initiate an operation that results in the action being performed by the new device; and
   a fourth component to configure the new device to perform the action based at least in part on the initiative taken by the existing device when executing the identified software.

2. The system of claim 1, wherein the second component associates the new device with the user by updating a user account record to register the new device as belonging to the user.

3. The system of claim 1, wherein the third component receives a message indicating completion of executing the identified software, the message to cause the fourth component to send a control command to the new device.

4. The system of claim 1, wherein the existing device, upon executing the identified software, sends a control command directly to the new device.

5. The system of claim 1, wherein the user input comprises input on a touch-screen display, a button press, a voice command, a wireless local area network signal, or a near field communication signal.

6. The system of claim 1, wherein the action comprises configuring the new device for a wireless local area network, displaying content received from the existing device, playing audio received from the existing device, or powering on electric devices.

7. The system of claim 1, wherein the second component server system is further configured to inform the user prior to automatically distributing the software to the existing device.

8. The system of claim 1, wherein the existing device comprises a personal computer, smartphone, tablet, watch, or glasses, and the new device comprises a television, a game system, a digital media receiver, network connected switch, or a refrigerator.

9. One or more non-transitory computer-readable media having computer-executable instructions that, when executed by one or more processors, cause the one or more processors to perform operations comprising:
receiving an indication that a user is to receive a new device;
determining the user has an existing device;
identifying software for the existing device, the software causing the existing device to send a configuration instruction to the new device;
distributing the software to the existing device wherein the software, when executed on the existing device, causes a configuration action to be performed by the new device in response to the configuration instruction.

10. The one or more computer-readable media as recited in claim 9, wherein the software comprises any one of a configuration application, an operating system, a version update of an operating system, or a functional application.

11. The one or more computer-readable media as recited in claim 9, wherein receiving an indication that a user is to receive a new device comprises receiving an indication that the user has purchased the new device.

12. The one or more computer-readable media as recited in claim 9, wherein determining whether the user has one or more existing devices comprises accessing user account records to ascertain whether one or more existing devices are associated with the user.

13. The one or more computer-readable media as recited in claim 9, wherein the action comprises configuring the new device for a wireless local area network, displaying content received from the one or more existing devices existing device, playing audio received from the one or more existing devices existing device, or powering on electric devices.

14. The one or more computer-readable media as recited in claim 9, having computer-executable instructions that, when executed by one or more processors, cause the one or more processors to perform operations comprising associating the new device with the user.

15. The one or more computer-readable media as recited in claim 9, having computer-executable instructions that, when executed by one or more processors, cause the one or more processors to perform operations comprising notifying the user before automatically distributing the software to the at least one of the one or more existing devices.

16. The one or more computer-readable media as recited in claim 9, having computer-executable instructions that, when executed by one or more processors, cause the one or more processors to perform operations comprising requesting permission from the user before automatically distributing the software to the at least one of the one or more existing devices.

17. A computer-implemented method comprising:
receiving, at a server, an indication that a new device is to be delivered to a user;
identifying software for the existing device, the software causing the existing device to send an instruction to the new device; and
distributing the software from the server to the existing device of the user that when installed and executed on the existing device is used to facilitate operation of the new device.

18. The computer-implemented method of claim 17, wherein receiving the indication that a new device is to be delivered to a user is triggered by a purchase of the new device by the user.

19. The computer-implemented method of claim 17, wherein the software is further used to assist in configuring the new device.

20. The computer-implemented method of claim 17, further comprising executing, at the existing device, the software to transmit a communication signal to the existing device.

21. The computer-implemented method of claim 17, further comprising associating, at the server, the new device with the user.

22. The computer-implemented method of claim 17, further comprising informing the user prior to distributing the software to the existing device.

* * * * *